(12) United States Patent
Tripp et al.

(10) Patent No.: US 6,983,322 B1
(45) Date of Patent: Jan. 3, 2006

(54) SYSTEM FOR DISCRETE PARALLEL PROCESSING OF QUERIES AND UPDATES

(75) Inventors: Gary W. Tripp, Bainbridge Island, WA (US); Michael D. Meadway, Snohomish, WA (US)

(73) Assignee: AI Acquisitions, Inc., Kirkland, WA (US)

(*) Notice: Subject to any disclaimer, the term of this patent is extended or adjusted under 35 U.S.C. 154(b) by 0 days.

(21) Appl. No.: 09/718,526

(22) Filed: Nov. 21, 2000

Related U.S. Application Data

(63) Continuation-in-part of application No. 09/419,405, filed on Oct. 14, 1999, now Pat. No. 6,516,337.

(51) Int. Cl.
*G06F 13/00* (2006.01)

(52) U.S. Cl. .................. 709/225; 709/217; 709/226; 707/3; 707/10

(58) Field of Classification Search ............... 709/102, 709/104, 203, 217, 219, 223, 313, 329, 225, 709/226; 707/3, 6, 8, 10, 104
See application file for complete search history.

(56) References Cited

U.S. PATENT DOCUMENTS

| | | | | |
|---|---|---|---|---|
| 4,575,798 A | * | 3/1986 | Lindstrom et al. ............. 707/7 |
| 5,519,855 A | | 5/1996 | Neeman et al. |
| 5,551,027 A | * | 8/1996 | Choy et al. ................. 707/201 |
| 5,694,593 A | | 12/1997 | Baclawski |
| 5,748,954 A | | 5/1998 | Mauldin |
| 5,761,696 A | * | 6/1998 | Giordano et al. ............. 711/6 |
| 5,781,896 A | | 7/1998 | Dalal |
| 5,819,086 A | | 10/1998 | Kroenki |
| 5,864,863 A | | 1/1999 | Burrows |
| 5,890,156 A | * | 3/1999 | Rekieta et al. ............... 707/10 |
| 5,897,639 A | | 4/1999 | Greef et al. |
| 5,983,228 A | * | 11/1999 | Kobayashi et al. ........... 707/10 |
| 5,991,762 A | | 11/1999 | Nagarajayya et al. |
| 6,049,804 A | * | 4/2000 | Burgess et al. ............. 707/100 |
| 6,070,158 A | * | 5/2000 | Kirsch et al. ................. 707/3 |
| 6,154,738 A | | 11/2000 | Call |
| 6,202,070 B1 | | 3/2001 | Nguyen et al. |

(Continued)

FOREIGN PATENT DOCUMENTS

GB 22967 * 10/1996

OTHER PUBLICATIONS

AltaVista Discovery—altavista.yellowpages.com.au/av/discovery/index.html; Oct. 1, 1999.

(Continued)

*Primary Examiner*—Viet D. Vu
(74) *Attorney, Agent, or Firm*—Black Lowe & Graham PLLC

(57) ABSTRACT

A data driven discrete parallel processing computing system for searches with a key-ordered list of data objects distributed over a plurality of servers. The invention is a data-driven architecture for distributed segmented databases consisting of lists of objects. The database is divided into segments based on content and distributed over a multiplicity of servers. Updates and queries are data driven and determine the segment and server to which they must be directed avoiding broadcasting. This is effective for systems such as search engines. Each object in the list of data objects must have a key on which the objects can be sorted relative to each other. Each segment is self-contained and doesn't rely on a schema. Multiple simultaneous queries and simultaneous updates and queries on different segments on different servers result in parallel processing on the database taken as a whole.

34 Claims, 14 Drawing Sheets

DATA DRIVEN DISCRETE PARALLEL PROCESSING

U.S. PATENT DOCUMENTS

| | | |
|---|---|---|
| 6,253,198 B1 | 6/2001 | Perkins |
| 6,256,622 B1 | 7/2001 | Howard, Jr. et al. |
| 6,336,117 B1 | 1/2002 | Massarani |

OTHER PUBLICATIONS

EWS Factsheet—Help visitors to your web site find what they're looking for fast-with Excite for Web Servers (EWS); www.excite.com/navigate/factshee.html; Oct. 1, 1999.

Smarter Searches: Why Search Engines are Again the Webs Next Big Thing;http://chkpt.zdnet.com/chkpt/adem2fpf/www.ancordesk.com/story/story_2913.html, Dec. 1998.

Filters untangling the Web we Weave; Sep. 13, 1999;http://www.wired.com/news/news/politics/story/21719.html.

Filters untangling the Web we Weave; Sep. 13, 1999;http://www.wired.com/news/news/politics/story/21719.html.

Filtering the Internet; Information Society Project at Yale Law School; Balkin, Noveck, Roosevelt; Jul. 15, 1999.

Introduction to Harvest; Duane Wessels; http://www.taradis.ed.ac.uk/harvest/docs/old-manual/node8.html; Jan. 31, 1996.

Viruses; Mike Meadway; Unpublished, updated.

Distributed Indexing/Searching Workshop; Agenda List, and Position Papers;Sponsored by the World Wide Web Consortium; May 28-19, 1996; http://www.w3.org/pub/WWW/Search/960528/cfp.html.

Search Engine Market Analysis; Notess.com Consulting Greg R. Notess; Apr. 28, 2000.

PC World's Enterprise Technology; choosing the right content management system; Paul, Fredric Jul. 2001.

Stanford Protocol Proposal for Internet Retrieval and Search; Gravano, Luis; Chang, Kevin; Garcia-Molilna; Hector; Paepcke, Andreas; Aug. 28, 1996.

Modern Information Retrieval; Baeza-Yates, Ricardo; Ribeiro-Neto, Berthier; AMC Press 1999.

* cited by examiner

DISTRIBUTED DATABASE

|   | 21<br>KEY | 22<br>ONE OR MORE CONSTRUCTS |
|---|---|---|
| 31 | 123 | ___ ; ___ ; • • • |
|    | 360 | ___ ; |
| 32 | ABLE | ___ ; ___ ; ___ ; ___ ; • • • |
| 33 | BAKER | ___ ; ___ ; |
| 34 | CLEF | ___ ; |
| 35 | COACH | |
|    | DIGGER | |
| 36 | ELEPHANT | |
|    | FLUTE | |
|    | FLUTE | |
|    | • | |
|    | • | |
| 41 | • | |
|    | SEQUEL | |
| 42 | SFORZANDO | |
|    | SPORT | |
| 43 | SQUAB | |
|    | • | |
|    | • | |
|    | • | |

SEGMENTED KEY-ORDERED LIST OF OBJECTS

*Fig. 3*

|    | 51 | 52 | 53 |
|----|-----|----------|----------|
|    | 0-9 | SERVER 11 | SERVER A |
|    | A-E | SERVER 12 | SERVER B |
|    | F-J | SERVER 13 | SERVER C |
|    | K-O | SERVER 14 | SERVER D |
| 54 | P-T | SERVER 15 | SERVER E |
| 55 | T-Z | SERVER 16 | SERVER F |

DATA DIRECTION SPECIFICATION

*Fig. 4*

| | 51<br>TYPE | 52<br>VALUE | 53<br>REFERENCE |
|---|---|---|---|
| 61 | DOMAIN | 360.COM | nnn.nnn.nn.n |
| | DOMAIN | GRAYBEAL.COM | nnn.nnn.nn.n |
| 62 | CONCEPT | AUTOMOBILE | nnn.nnn.nn.n |
| | CONCEPT | PERSON | nnn.nnn.nn.n |
| 63 | IMAGE | KENNEDY, J.F. | nnn.nnn.nn.n |
| | IMAGE | TRUMAN, H. | nnn.nnn.nn.n |
| 64 | SOUND | AIR ON A G STRING | nnn.nnn.nn.n |
| | SOUND | I HAVE A DREAM | nnn.nnn.nn.n |
| | SOUND | STAIRWAY TO HEAVEN | nnn.nnn.nn.n |
| 65 | XML TAG | NAME | nnn.nnn.nn.n |
| | XML TAG | TAXPAYER ID # | nnn.nnn.nn.n |
| 66 | VIDEO | KING KONG | nnn.nnn.nn.n |
| | VIDEO | CITIZEN KANE | nnn.nnn.nn.n |
| 67 | CATEGORY | NEWS | nnn.nnn.nn.n |
| | CATEGORY | RETAIL | nnn.nnn.nn.n |
| 68 | COMMUNITY | PATENT ATTORNEYS | nnn.nnn.nn.n |
| | COMMUNITY | NON-PROFIT ORGS | nnn.nnn.nn.n |
| 69 | WORD | ABLE | nnn.nnn.nn.n |
| | WORD | HEXAGON | nnn.nnn.nn.n |
| | WORD | TEST | nnn.nnn.nn.n |
| 70 | WORD | TEST | nnn.nnn.nn.n |
| | WORD | ZULU | nnn.nnn.nn.n |

SEGMENTED INDEX OF TYPE-VALUE PAIRS

SYSTEM FOR DISCRETE PARALLEL PROCESSING OF QUERIES AND UPDATES

This application is a continuation-in-part of U.S. application Ser. No. 09/419,405, filed Oct. 14, 1999, now U.S. Pat. No. 6,516,337.

FIELD OF INVENTION

This invention relates to computer data base systems, specifically data base systems where the data to be updated or queried is distributed over multiple servers.

BACKGROUND

When large data bases need to be able to respond in a timely fashion too large numbers of queries, it is desirable to distribute the data base over multiple servers so that the many servers can each respond to queries at the same time. Similarly, where the data base is frequently being updated, a greater rate of updates can be handled with each server updating only a portion of the data base.

There are many distribution schemes for distributed databases. If the data base consists of multiple tables, it is common to place one table in each server. Alternatively, records within a table may be distributed by placing records one through n on a first system and records above n on a second system. As a further alternative, column A of a table may be on one server while column B of the same table is on another server.

As shown in FIG. 1, all of these data base distribution schemes require a shared table or index or schema of some kind to coordinate the different portions of the distributed data base during queries and updates. This requirement for coordination between the various segments imposes scale and performance limitations on distributed data bases as well as challenges for fault tolerance in case one of the distributed segments ceases to function. In addition, complex locking schemes which account for communications delays and topologies must be implemented to ensure that distributed columns or records are not improperly modified.

To avoid the coordination and locking problems with distributed data bases, where the data can be kept in multiple separate databases, it is known to arrange multiple databases in parallel. Each query is sent to all of the databases and the responses from all of the databases are then aggregated, with or without filtering or elimination of duplicates, to provide the response. Similarly, each update is sent to each database and the individual database system decides whether the update is relevant to its dataset. Because the databases need not coordinate or otherwise communicate with each other, the coordination and locking problems of a distributed database are avoided. However, this still presents a scalability problem and a speed problem because the updates and queries must be sent to all databases and each database must take the time to receive and respond to each update and each query.

SUMMARY OF THE INVENTION

The invention is a data driven discrete parallel processing architecture for distributed simple data bases. This invention is effective for systems where the data base can be organized in one ordered list and the list can be segmented and constructed such that the data contents of each update transaction are sufficient to determine the segment of the list to which the update should be directed and the data contents of each query transaction are sufficient to determine the segment of the list to which each query should be directed. Consequently, each object in the list must have a key on which the objects can be sorted relative to each other. Two or more objects can have the same key. The queries and updates each include data content that can be compared to the key to find a match, place a new object into sorted order, modify an object, or delete an object.

In all respects, the data set on each server is entirely self contained; that is, it does not require references to other data tables, such as data dictionaries, that are shared between segments. It therefore will not work for relational databases—the data set must be representable as a single, key-ordered list of objects. Except for each object having a key on which the objects can be sorted, the objects need not have anything in common. Each object consists of a key and any number of constructs which can include different data types; they can have different numbers or lengths of fields; and each field is preferably of variable length. Unlike a traditional database using fixed numbers of fields for each record or fixed field sizes, in the preferred embodiment, the data storage requirements are the minimum necessary to represent the data as formatted. Empty fields are not be stored—there is simply no reference to them at all. Alternatively, the numbers of fields in each object can be fixed, in which case the list of objects is simply a standard table of a database, and the field lengths can be fixed as well.

Although it must be possible to represent the entire data set as a single, key-ordered list, the segments of the list that are placed on each server do not have to be exclusive of each other. Two segments can overlap. Or the segments on two or more servers can be identical. In these cases, a query or an update may be directed to two or more segments and two or more responses may be received. However, in the preferred embodiment, the segments do not overlap (each is a proper subset of the list) to avoid the need for queries or updates to be directed too more than one server.

An example of an application where the invention may be employed is an index for an internet search engine. The search engine receives queries which are specifications of words where the user is searching for web-site pages containing the words. If the index for the internet search engine is distributed based on the content of the data of each query, i.e. the keys shown in the first column of FIG. 3, a query for a particular word can be directed to the server which contains, in alphabetical order, those words within the index which include the queried word if it exists in the index. Likewise, because each update to the index consists of a key word plus a reference to a web page where that word was found, each update can be directed to only one of the servers and no update change must be made on any other server.

Thus, where the updates and queries can be data driven to determine the segment of a distributed key-ordered list of objects to which they must be directed, the list can be divided into segments based on content and distributed among a multiplicity of servers as shown in FIG. 2. In this example, the list is segmented based on the first character in the key for each object in the list. All updates where the key word begins with a number are directed to server 11; all updates where the key word begins with the letters A through E are directed to server 12; etcetera. Likewise, all queries where the key word begins with a number are directed to server 11; all queries where the key word begins with the letters A through E are directed to server 12; etcetera. The objects in each segment are complete unto themselves—that is, they include no references to any data construct associated with another segment. This allows the segment within each server to stand on its own and requires no reference to other data tables on other servers to complete each update or to completely respond to each query.

By structuring the data base as one large list of objects that is sorted based on a key that is the entire basis for directing updates to segments of the data base and directing queries to segments of the data base, the data base can be segmented based on a possible range of values of the key for each segment. For example, as shown in FIG. 3, a first segment 31 consists of all objects with keys 21 beginning with a numeral. A second segment 32 consists of all objects with key words 21 beginning with the letter A. A forth segment consists of all objects with key words 21 beginning with the letters A through CL. A fifth segment consists of all words 21 beginning with the letters CO through CZ.

A limitation of this method of segmenting a data base is that the segments will not be of equal size. As the data changes over time, randomness will cause some segments to grow or shrink more than others. However, as the costs of data storage have declined, this is not a significant problem. Of course, extreme imbalances can be rectified by human intervention in a manual process which requires coordination between various segments.

Because the processes executed by each segment server are entirely independent of each other, the system architecture allows for truly discrete parallel processing. Consequently, there is no upper limit to the scalability or performance of the system. Even the update processor 2, the query processor 3, and the query reply processor 5 can be duplicated as many times as necessary to allow parallel processing in the directing functions without coordination or communication between them. Using multiple update or query processors does not increase overall system overhead. Each connection to a database server may be via a physically separate channel.

In the preferred embodiment, the key words are stored in their full length without translation via a data dictionary.

Alternatively, to reduce storage requirements, the ASCII words for a segment may be translated to shorter average representations with a data dictionary on the server for that segment. However, this introduces a second lookup without providing much in the way of storage savings when working with text databases. The average word length is about nine bytes. This is small enough that the storage saved is not worth the extra I/O time required for dictionary maintenance. With a dictionary, each word must have an ID which is subsequently stored in the entry table. The ID must always be unique therefore a lock/load/increment/store/unlock must be performed for new words. This introduces a bottleneck for insertions since multiple processes must contend for a required resource (the counter record). There is also an issue of recoverability. If the dictionary is corrupted, the index table has no meaning because there is no way to map word ID values back to the text.

BRIEF DESCRIPTION OF THE DRAWINGS

FIG. 3 shows a prototypical segmented data table.
FIG. 4 shows a data driven specification as used by the query processor and the update processor.
FIG. 5 shows a segmented index of type value pairs.

DETAILED DESCRIPTION OF THE INVENTION

Figure 1:
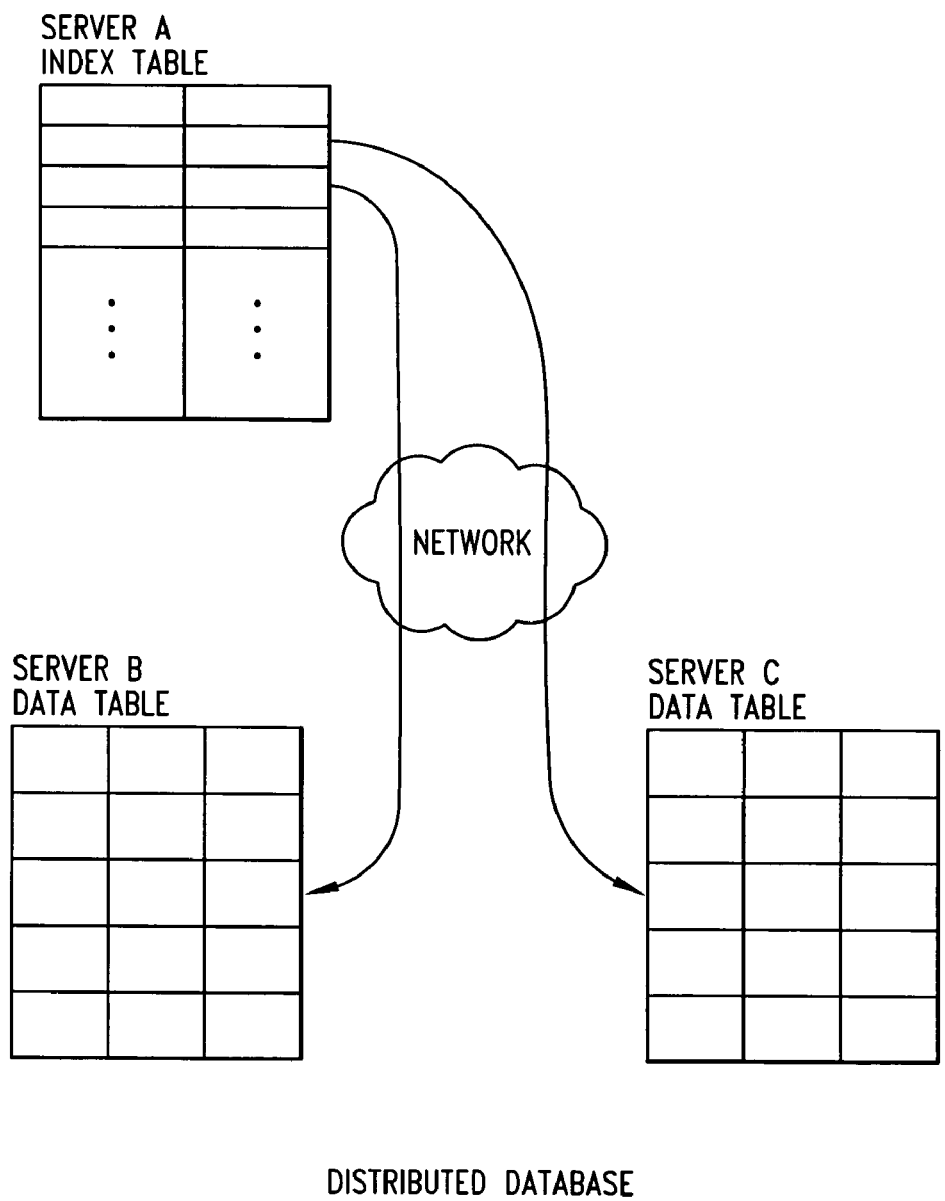
FIG. 1 shows a prior art distributed data base.
Figure 2:
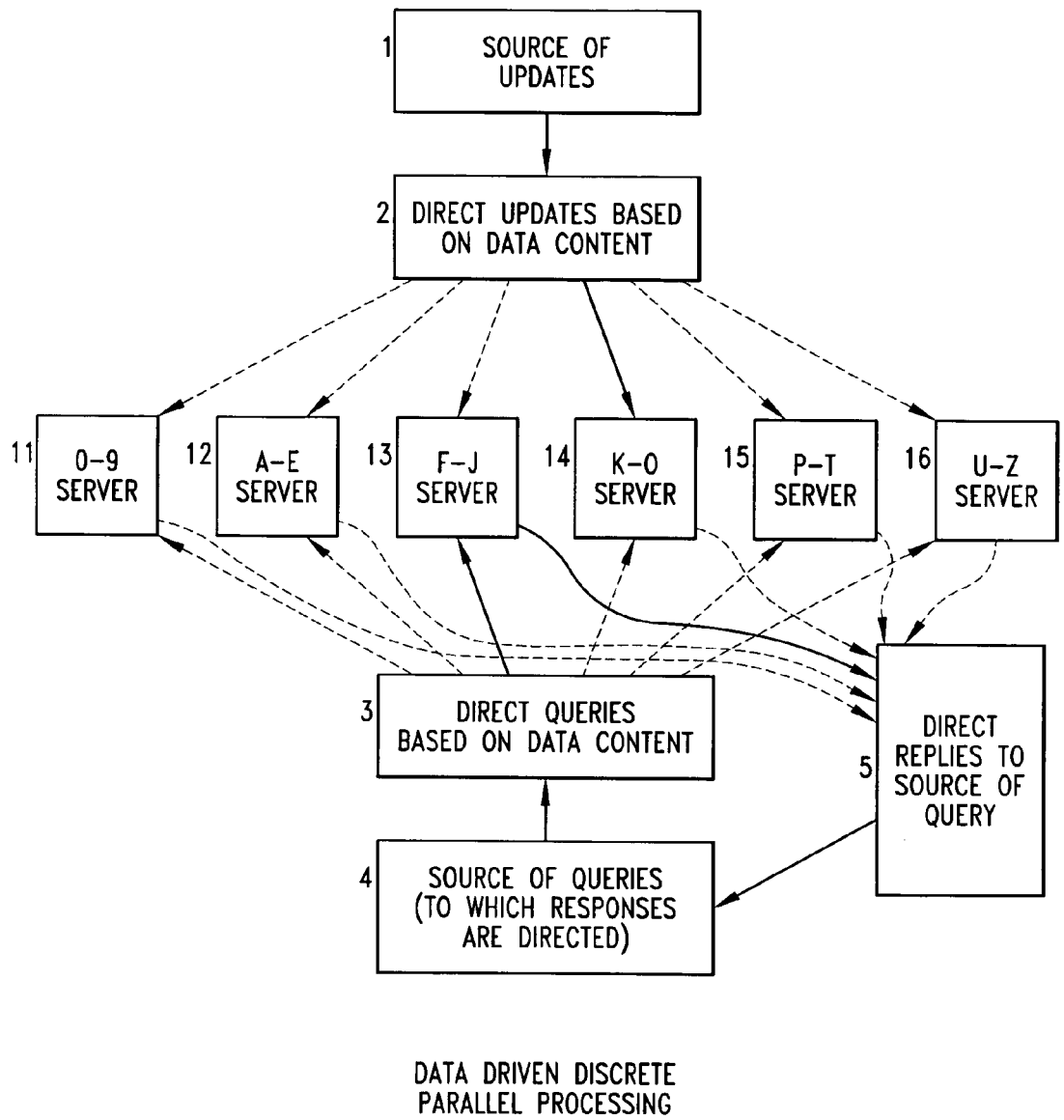
FIG. 2 shows the architectural data driven parallel processing.

As shown in FIG. 2, the data base, which consist of one key-ordered list of objects, is segmented based on content of the key of the objects such that objects with keys beginning with a numeral are on server 11, objects with key words beginning with the letters A through E are on server 12, objects with key words beginning with the letters F through J are on sever 13, objects with key words beginning with letters K through O are on server 14, objects with key words beginning with the letters P through T are on server 15, and objects with key words beginning with the letters U through Z are on sever 16.

The system operates with any source of updates 1. The updates are directed to an update processor 2 which routes the updates to one of many servers based on data content.

The system operates with any source of queries 4 where each query includes a key. A query processor 3 routes the queries to one of the servers based on the data content of the query. A query reply director 5 returns the response from the appropriate server to the source of the query.

An example of a data base which may be segmented in accordance with the present invention is shown in FIG. 3. It is an ordered list of objects, each object having a key 21 and each object having additional data constructs 22. Although the database must be organized as one list or table, it could have any number of items or fields in each object.

In FIG. 3, the key column 21 holds alphanumeric keys. As shown in FIG. 3, this list can be easily segmented such that objects having keys beginning with a numeral are in the first segment 31, objects having keys beginning with the letter A are in the second segment 32, objects having keys beginning with the letter B are in the third segment 33, etcetera. As shown in segment 36, two or more objects can have the same key. If there are many objects in the list which have a key beginning with the same letter, such as the letter C or the letter S, objects having keys beginning with this letter can be further segmented by looking at the second character in the key. For example, as shown in FIG. 3, the fourth segment 34 includes keys beginning with CA through CL; and the fifth segment 35 consists of keys beginning with the letters CO through the letters CZ. Similarly, a later segment 41 consists of keys beginning with characters SA through SE; a subsequent segment 42 consists of keys beginning with the characters SF through SP; and a further segment 43 consist of keys beginning with the characters SQ through SZ.

FIG. 4 shows a look-up table that is stored in the query processor and in the update processor to determine to which server a query or an update should be sent. For each update or query, the first character of the key (or first two or three characters) is compared to the entries in column 51 and the appropriate server to which it should be sent is found on the row. As shown by the entries in rows 54 and 55, two segments can overlap. As shown by the entries in columns 52 and 53, each query or each update can be directed to multiple servers.

As shown in FIG. 5, the primary key need not be a word. In FIG. 5, the primary key 51 is a data type which specifies the type of data at a location on a network. The secondary key 52 contains a value associated with the data at that location, such as a title of the data or a word within the data. Associated with this type-value pair is a reference 53, in the form of a URL or some hash of a URL, to a location on a network where data of the type and value can be found.

The ordered list of FIG. 5, which is useful as an index for an internet search engine, is segmented primarily based on type. The first segment 61 consists of the type "domain". The second segment 62 consists of the type "concept". The third segment 63 consists of the type "image". The fourth segment 64 consists of the type "sound". The fifth segment 65 consists of the type "XML tag". The sixth segment 66 consists of the type "video". The seventh segment 67 consists of the type "category". The eighth segment 68 consists of the type "community". The ninth and tenth segments 69, 70 consist of the type "word". As shown in this Figure, a type with a large number of records can be further segmented based on a value or on a part of a value which, in this case, is the value column 52. For example, in FIG. 5, words beginning with the characters A through M are in the ninth segment and words beginning with the characters N through Z are in the tenth segment. Also, as shown in the tenth segment 70, two objects can have the same key and value but different references.

Segmented Index for Network Search Engine

Figure 6:
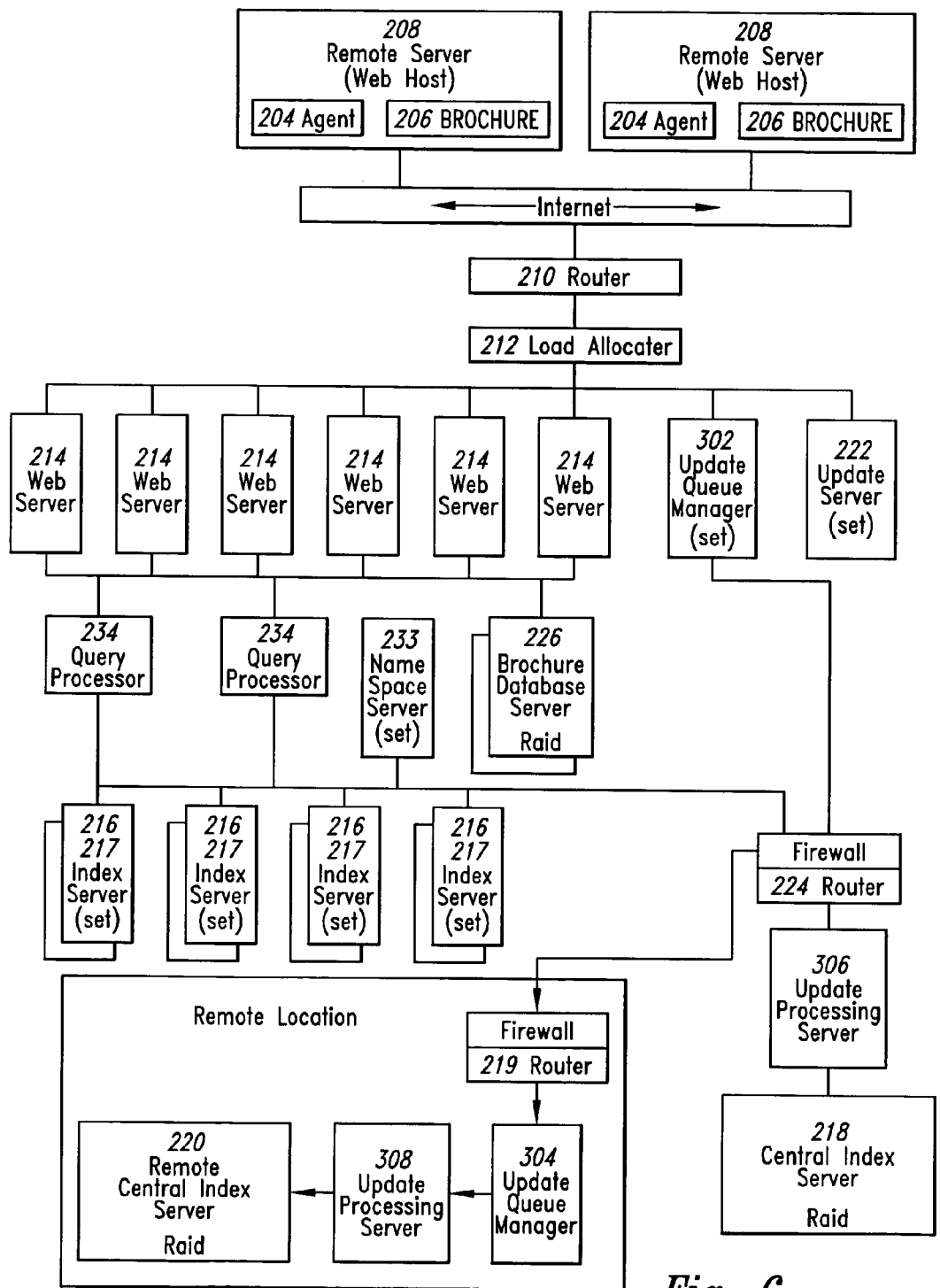
FIG. 6 is block diagram showing the architecture of a search engine for indexing the world wide web according to one embodiment of the present invention.

FIG. 6 is a block diagram of an indexing system for a network search engine according to one embodiment of the present invention. The system includes a central server that stores a central index.

Each of the components in the central server will now be described generally, with these respective components being described individually in more detail below. The central server includes a router 210 that directs packets comprising search requests and update transactions through a load balancing switch 212 to an appropriate set of servers 214, 302 and 222. The switch 212 balances traffic to all web servers 214 to prevent overloading respective web servers and improve overall performance of the central server. The router 210 also functions to allow offline updates of index server sets 216 and as a dispatch point to prevent searches from being applied to an index server currently receiving updates, as will be explained in more detail below. The web servers 214 generate the parallel queries necessary to perform a search using the index servers 216. In one embodiment of the central server, there are twenty web servers 214.

The central server further includes a master index server 218 containing a master copy of the entire central search index or catalog. In the embodiment of FIG. 6, the master index server 218 has a redundant array of independent disks or RAID 5 to provide protection against disk failures and loss of the central search index. In addition, the central index stored on the master index server 218 is also stored on a remote master index server 220 at a different physical location to provide backup of the central search index.

A number of update servers 222 each receive updates. Each of the update processors 222 applies all index change transactions through a firewall/router 224 to the master index server 218 which, in turn, updates the central search index and then distributes those changes to the various index servers sets 216. The master index server 218 also sends instructions to the Name Space/Directory Server 233 to dynamically determine which set of index servers 216 is to remain on-line to service search requests, and which set is to receive the updates.

Changes to the index are received as transaction lists and each transaction list is stored on one of the update servers 222. The transaction list is referred to as a batch, and each batch contains a series of deletion and addition transactions formatted as commands. More specifically, each batch represents an incremental change record. The update server 222 thereafter transfers each batch to the master index server 218 which, in turn, updates the master index to reflect the index changes in the batch. It should be noted that only "incremental" changes are transmitted to the central server.

Figure 7:
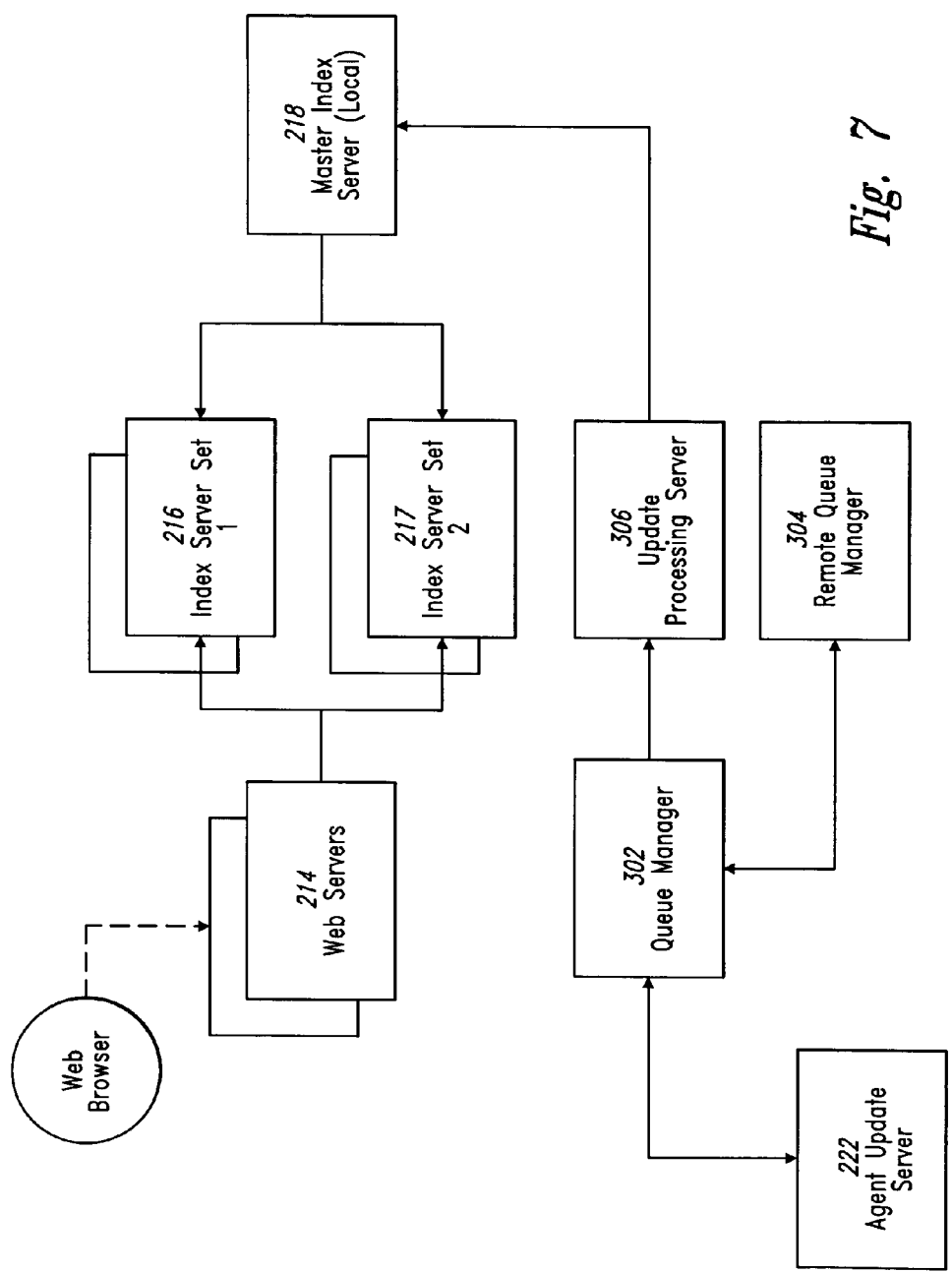
FIG. 7 is functional block diagram of the central server of FIG. 6.

The overall operation of the central server will now be described in more detail with reference to the functional block diagram of FIG. 7. In FIG. 7, many components previously discussed with reference to FIG. 6 are shown, and for the sake of brevity the detailed operation of each such component will not again be described in detail.

The queue manager 302 receives update transaction batches from the update server 222, as will be described in more detail below.

The central server also performs index update processing to update the central index stored on the master storage server 218 and the segmented central index stored on the index servers 216, 217, as will now be described in more detail.

The queue manager 302 stores the received update transaction batches, and periodically transmits a copy of the stored transaction batches to a remote queue manager 304 for processing by update processing manager 308 and being applied to the remote master storage server 220. The queue manager 302 also periodically transmits a copy of the stored transaction batches to and update processing server 306. The queue manager 302 stores update transaction batches received during a predetermined interval, and upon expiration of this interval the update batches are transferred to the update processing manager 308. Upon receiving the update transaction batches, the update processing server 306 applies all the batches to update the central index stored on the master storage server 218. Once the central index stored on the master storage server 218 has been updated, the master storage server 218 applies the update transaction batches through the router to update the segmented central index stored on the index server sets 216, 217.

During updating of the segmented central index stored on the index server sets 216, 217, the update transaction batches are directed to only one set of index servers 216, 217 while the other set remains online to handle search queries, and thereafter places the updated set of index servers 216, 217 online and updates the set previously online. For example, assume the index servers 216 are the primary set of index servers and the servers 217 are the secondary set. Each index server set 216, 217 can contain all or a portion of the central index 218. As seen from the above example, the primary and secondary index server sets 216 and 217 eliminate the need for record locking of the segmented central index to which search queries are applied. Thus, all records of the segmented central index are always available for search queries. Moreover, if one server of the primary index server set 216 or 217 fails, the remaining servers of that set will continue to serve queries. If the entire server set fails, the corresponding secondary index server set is made the primary so that the entire segmented central index is available for applied search queries. It should be noted that in the unlikely event that both the primary and secondary index server sets 216, 217 for a particular segment of the central index simultaneously fail, the remaining segments of the central index remain available for applied search queries, and only the segment of the central index stored on the failed index servers becomes unavailable. In other words, search queries are still applied to the vast majority of the central index so that reasonable search results may are still obtained. In a case were both server sets fail, queries for the segment that had failed could be sent to central index.

The index server sets are used to provide query results for searches submitted by the Web Servers. Each set of servers is identical, and each set of servers contains a portion of the overall index. Initially, the division will be alphabetical and numerical, for a set of 36 servers. Server "A" would contain the index for all words beginning with "A". Only one set of servers is updated at a given time, while the other set remains on-line to service search requests. This permits the system to be run without file-locking constraints and allows for failover should a server become inoperative.

FIG. 7 is a bubble chart illustrating the process executed by the queue manager 302 of FIG. 7 in queuing update entries and transferring these entries to the remote queue manager 304. The queue manager 302 receives update entries 600 from the update server 222 and places these update entries in an update queue 604. The entries in the queue 604 are transferred to a queue database 606. Once the queue 604 is done receiving update entries 600, 602, which may be when the queue is full or at predetermined intervals, the queue manager 302 goes to step 608 and retrieves the queue entries from the queue database 606 and sends them to the remote queue manager 304. As previously described, the update entries stored in the queue database 606 are thereafter processed by the update processing server 306 (see FIG. 7) to update the local master index on master index sever 218 (see FIG. 7). The queue manager 302 also receives a deletion request (not shown) from the update processing server 306 and deletes update entries stored in queue database 606 in response to this deletion request, as will be explained in more detail below with reference to FIG. 9.

Figure 8:
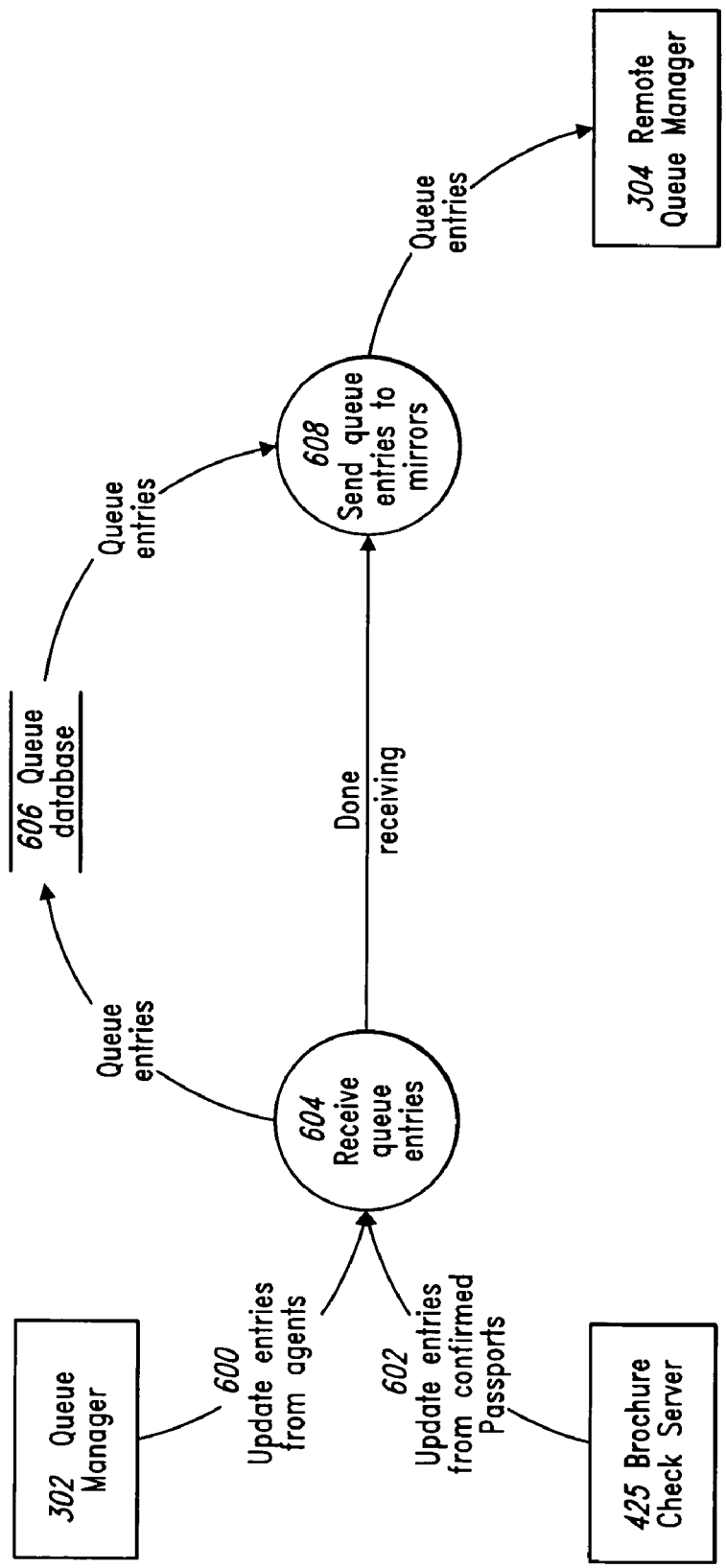
FIG. 8 is a bubble chart illustrating the process executed by the queue manager of FIG. 7 in queuing update entries and transferring these entries to the remote queue manager of FIG. 7.
Figure 9:
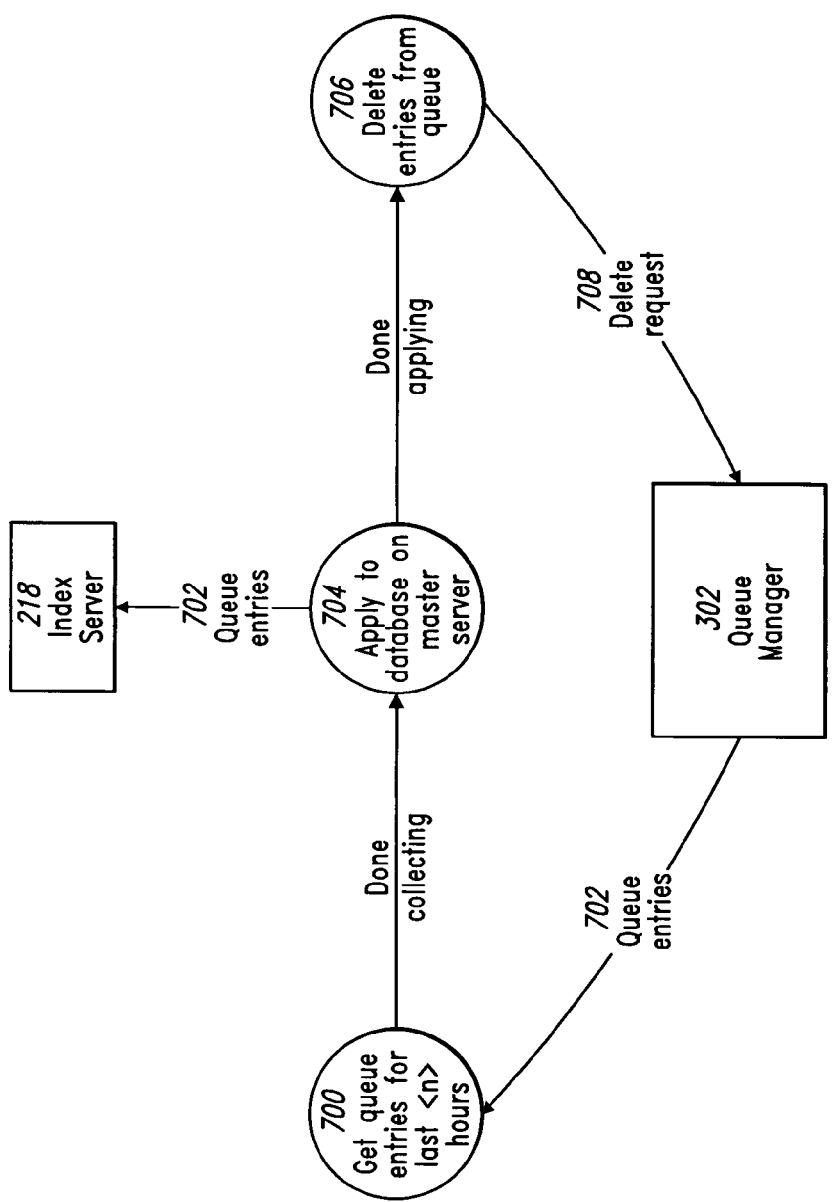
FIG. 9 is a bubble chart illustrating the process executed by the update process server of FIG. 7.

FIG. 9 is a bubble chart showing the process executed by the update processing server 306. The process begins in step 700 with the update processing server 306 retrieving queue entries 700 from the queue manager 304. In the embodiment of FIG. 9, the queue entries 702 are retrieved periodically so that in step 700 the queue entries for the last N hours are retrieved. From step 700, the process proceeds to step 704 and the update processing server 306 applies the queue entries to the master index server 218 which, in turn, utilizes the queue entries in updating the master index, as previously described. Once the queue entries 702 have been applied to the server 218, the process proceeds to step 706 and the update processing server 306 applies a deletion request 708 to the queue manager 302 (see FIGS. 7 and 8). In response the deletion request 708, the queue manager 302 deletes the update entries stored in the queue database 606 that have now been applied to the master index server 218. The central index on the master index server 218 has now been updated to include entries in the queue database 606, so these entries are deleted since they are now reflected in the central index and thus no longer needed.

Figure 10:
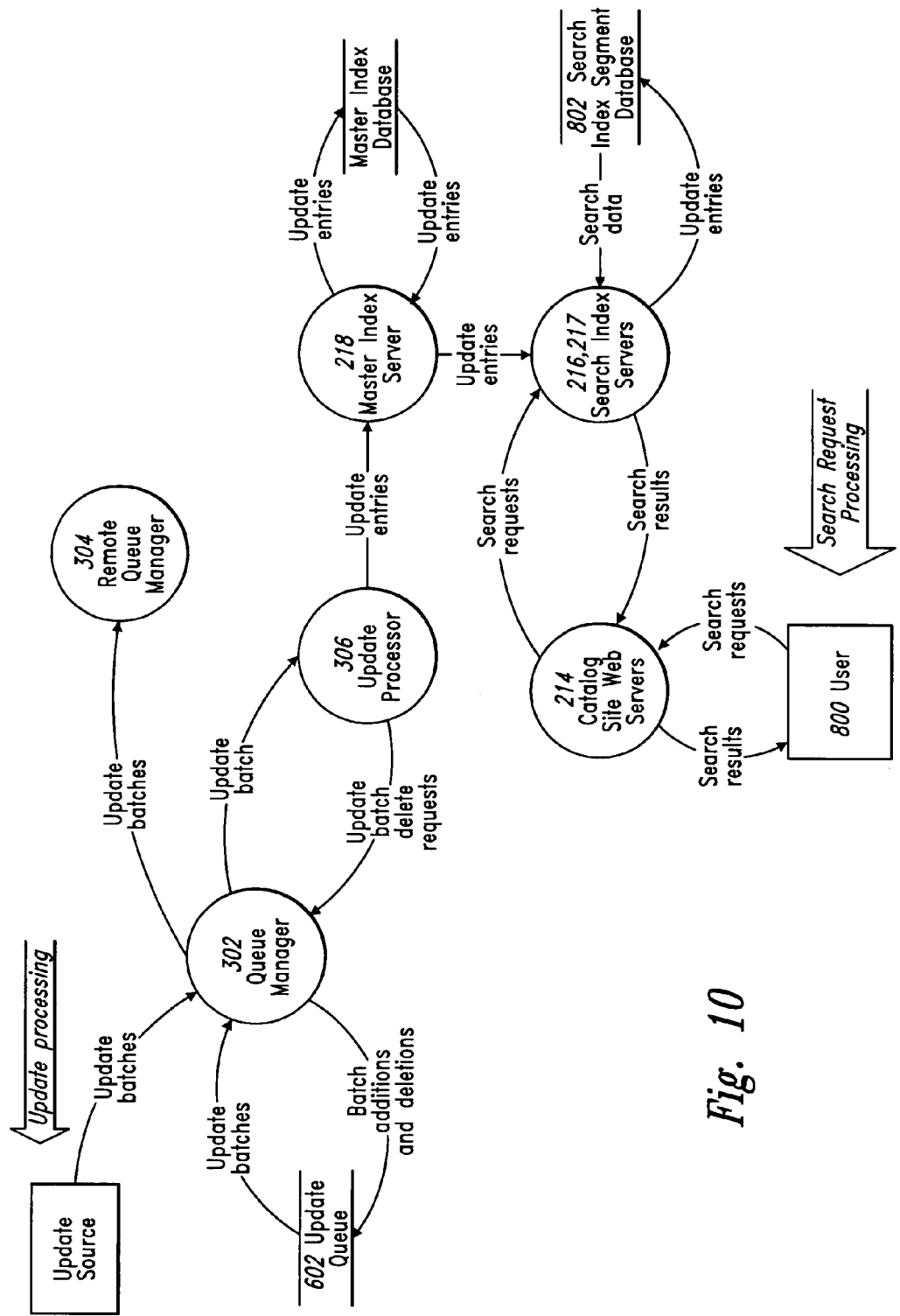
FIG. 10 is a bubble chart illustrating the overall data flow in the search engine of FIG. 7.

FIG. 10 is a bubble chart illustrating the overall data flow between the search engine, agent, and brochure components of the active indexing system. Each aspect of the overall data flow has already been described in a corresponding section above, and thus FIG. 10 will now be described merely to provide a brief description of the overall data flow of the indexing system according to one embodiment of the present invention. The components of the process in FIG. 10 may logically broken into two functional groups, an indexing group and a searching group. In the searching group, a user 800 applies a search request to one of the web servers 214, which processes the search request and applies it to selected ones of the index servers 216, 217. In response to the applied search request, each of the search index servers 216, 217 queries its corresponding local index segment 802 and generates search data. The index servers 216, 217 then return the search results to the web server 214, which, in turn, provides the user 800 with the search results corresponding to his applied search request.

The remaining components in the FIG. 10 are in the indexing group. The queue manager 302 receives updates, as previously described. The queue manager makes update and deletions to the queue database 602 corresponding to the received updates, and also provides a mirror copy of these updates to the remote queue manager 304. The update processing server 306 retrieves the update entries from the queue manager 302, and applies the updates to the master index servers 218. The server 218 updates the master index to include the applied updates, and the update processing server 306 then sends a deletion request to the queue manager 302 to delete the corresponding entries from the queue database 602.

Once the master index server 218 has updated the master index, the server updates the segmented index stored on the search index servers 216, 217 as previously described. Each of the search index servers 216, 217 updates its corresponding portion of the segmented index in response to the updates from the master index server 218.

The server architecture of the system will now be described. The server architecture provides a number of services which support the management and use of segmented index information. The system is divided into several components which can be run on different machines, as needed, in a truly distributed architecture. The design must scale well and be self-healing wherever possible. To make this possible, Jini technology plays an important role in the architecture and services are exposed using that infrastructure. As components are brought online, they advertise that their existence to the local Jini lookup service. This information is automatically propagated to services that need access to other services, and handshaking brings elements into the Jini community as they are announced. If non-critical parts of the system become unavailable, the system is able to compensate by distributing load to other machines hosting the necessary services.

Figure 11:
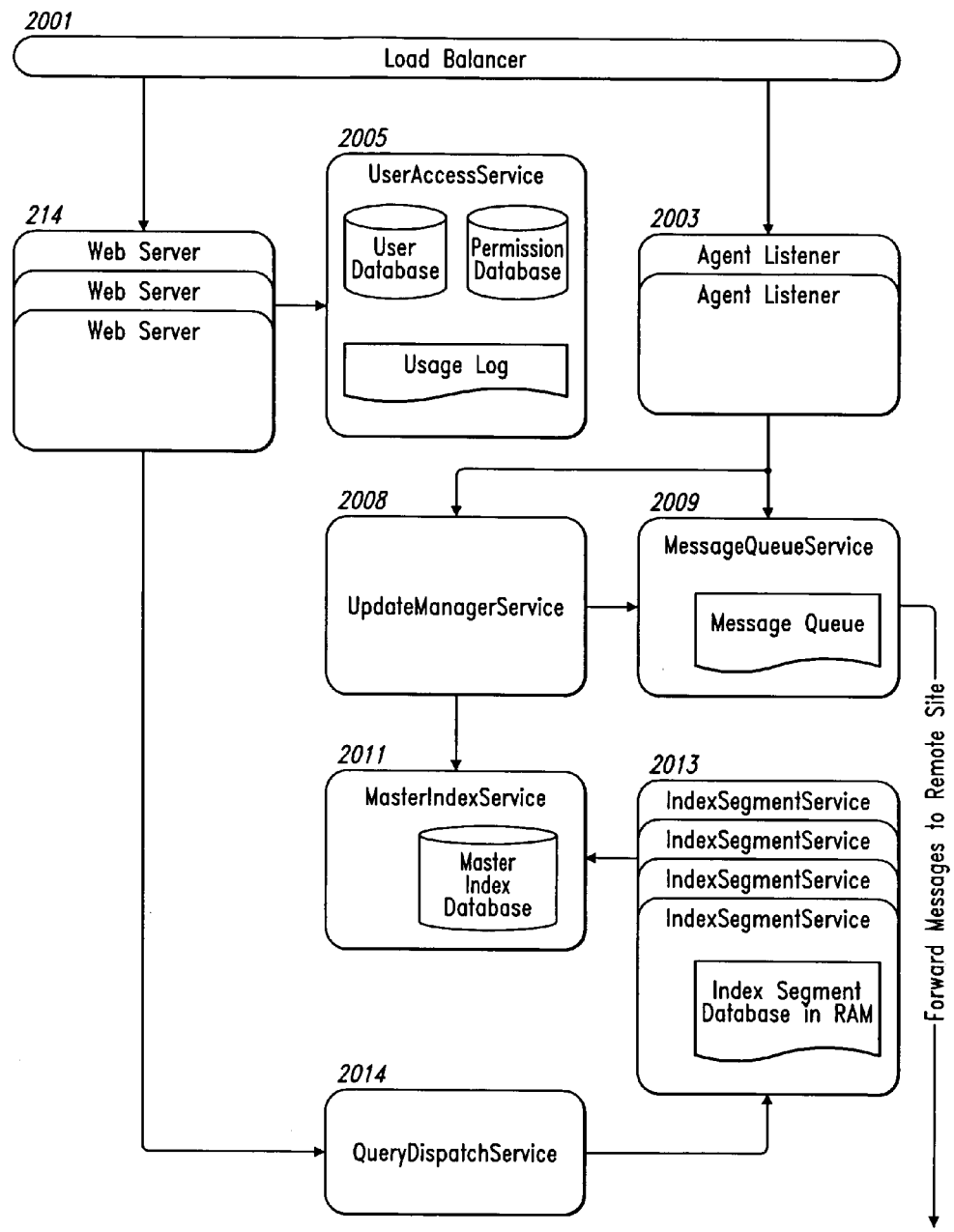
FIG. 11 illustrates components of the indexing system of FIG. 6 for a Java-based implementation of the indexing system according to one embodiment of the present invention.

As shown in FIG. 11, a load balancer 2001 allows round-robin distribution of incoming traffic to web servers and the agent listener. The web servers 214 provide user services like account registration and search capabilities. The AgentListener 2003 is a secure socket listener that manages agent connections. One of the components is a UserAccessService 2005, which controls access. Users can make queries on the search index. These are handled by the QueryDispatchService 2014, which delegates subqueries to appropriate IndexSegmentServices 2013. Incoming information for updates is added to the MessageQueueService 2009 and popped off by the UpdateManagerService 2008, which coordinates information to ensure we have the latest updates. Collected changes are added and/or removed in the MasterIndexService 2011.

FIG. 11 shows request/response flow with the direction of arrows. The intent is to make clear who is asking for the execution of respective services. The web server 214, serving up static and dynamic content through Servlets and Java Server Pages, can communicate with the UserAccessService 2005 and the QueryDispatchService 2014, but nothing else. The AgentListener 2003 can talk to the UpdateManagerService 2008 and the MessageQueueService 2009 only. An IndexSegmentService 2013 is able to initialize itself by asking for information from the MasterIndexService 2011. Finally, the UpdateManagerService 2008 can talk to the MessageQueueService 2009 and the MasterIndexService 2011. Its job is to keep the MasterIndexService 2011 up to date by processing incoming update messages.

An IndexSegmentService 2013 is associated with a given Index Segment Range, which determines the prefix character range for the index content. When an IndexSegmentService 2013 is brought online, it automatically becomes available to the QueryDispatchService 2014. If one of these services is reinitialized periodically, the update will be completely transparent, so long as another IndexSegmentService 2013 covers the same Index Segment Range. This might be a single server or may be distributed arbitrarily across a number of IndexSegmentService instances. So long as a QueryDispatchService instance is available to the web servers, and sufficient IndexSegmentService instances are available to cover the full range of possible tokens, the system is capable of executing queries.

The packages separate functionality groups into logical divisions of labor. A description of selected packages follows. In each description, we include a UML class diagram and a table describing the class in more detail. The class specification uses the JavaDoc approach.

Figure 12:
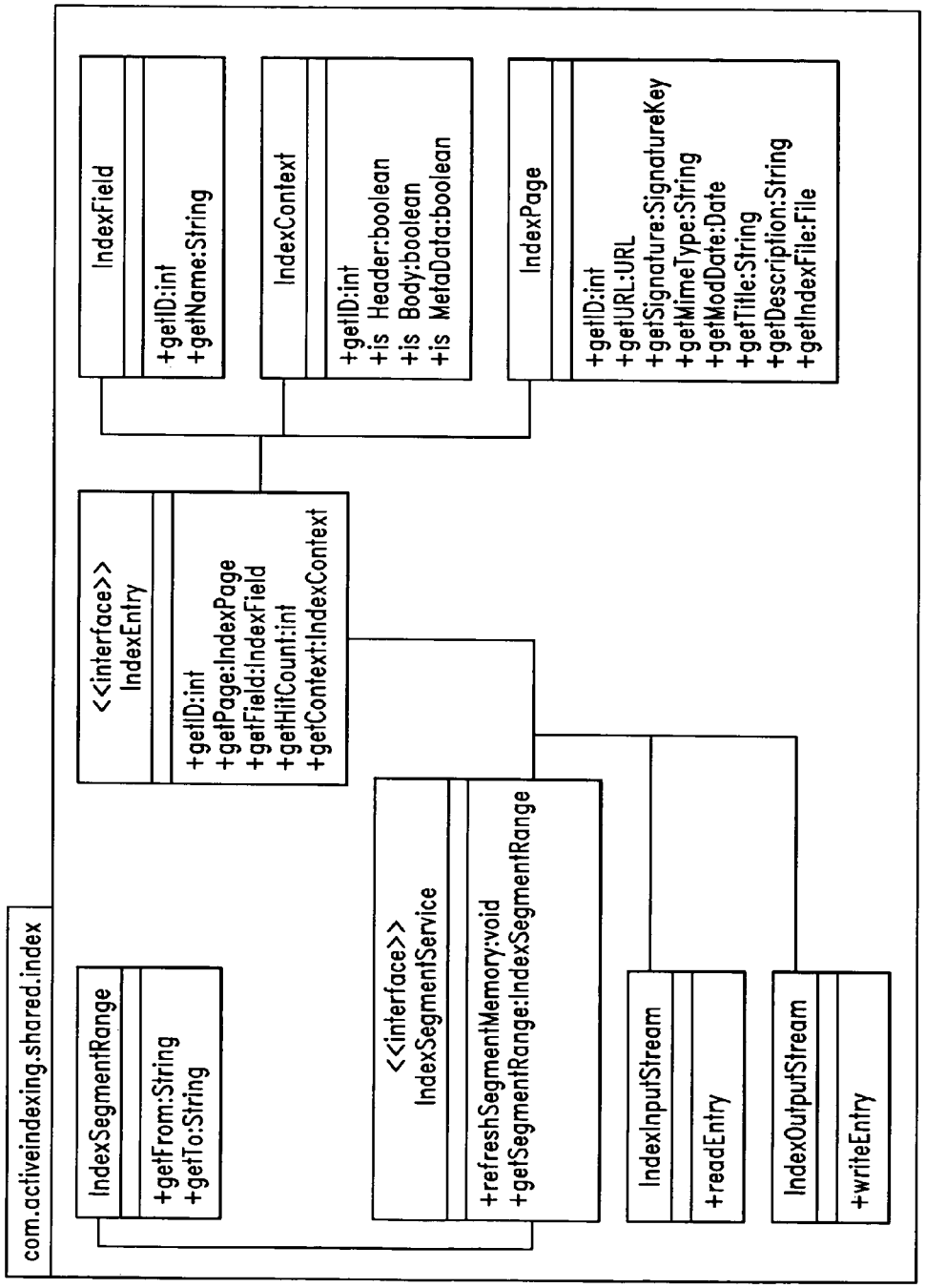
FIG. 12 shows a class package for the segmented index.

The com.activeindexing.shared.index package contains classes related to indexing and includes the IndexSegmentService as shown in more detail in FIG. 12. The following Table 1 describes each of the classes of FIG. 12 in more detail.

transmits copies of the batches to redundant remote catalog sites. A remote update batch processor 4704 receives and applies batches received from a master catalog site to a local index server for the purposes of redundancy. An index server 4706 stores all search index information in a series of database segments, and creates result sets from queries applied to it as a result of search requests received by the web server 4700.

An update batch storage area 4710 contains the received update batches transmitted from remote hosts, and these batches are deleted after processing. An index segment storage area 4712 contains a subset of the total index database for the index server 4706. For example, a single segment might contain the keyword fields for all of the keywords beginning with the letter "A". Typically, these storage areas will be placed on high-speed RAID storage systems. An index segment storage twin area 4714 is identical to the storage area 4712. The purpose of the twin area 4714 is to provide access to existing index information while the corresponding index segment storage area is being updated. This permits updates to be applied to a segment without requiring record locking. The index server 4706 is simply notified as to which segment areas are available for search processing. Once updated, the area 4712 or 4714 becomes available again.

Figure 13:
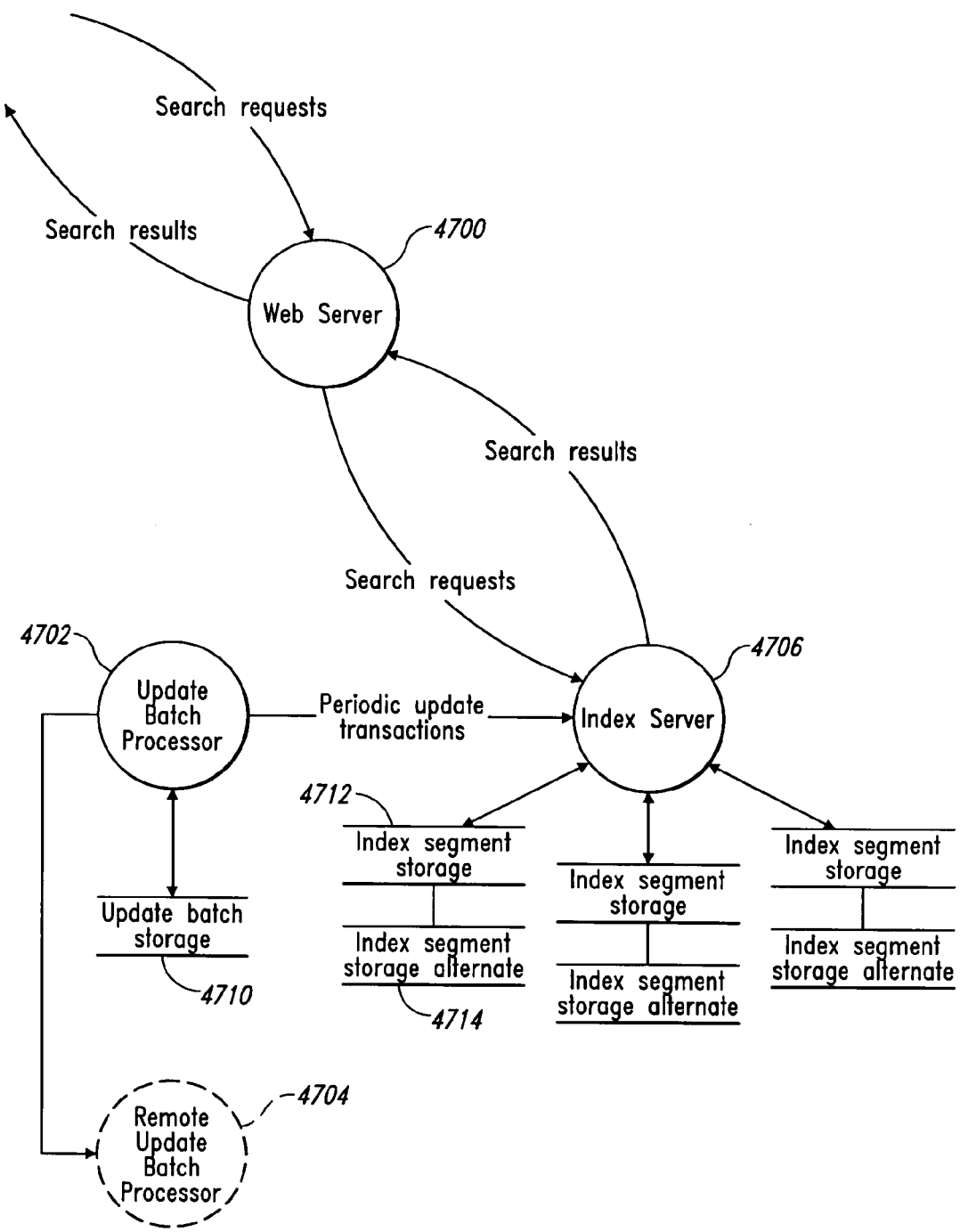
FIG. 13 is a functional data flow diagram illustrating an alternative embodiment of the central cataloging site of FIG. 6.

In operation of the system of FIG. 13, the update processor 4702 periodically updates the index segments on the index server 4706. All updates received are applied as batches to retain data integrity on the index server 4706. The update processor 4702 separates update information as required to match the segments on the index server 4706, then updates each segment storage area 4712 and each segment storage twin area 4714. While a segment storage area 4712, 4714 is being updated, its counterpart is available for search request processing.

In processing search requests, the web servers 4700 receive and interpret the search requests from remote portals or web browsers. Each search request is preprocessed to divide the request into sub-requests as required for each index segment, then the index server 4706 is requested to perform search queries on each relevant segment. More than one index segment may be queried simultaneously. The

TABLE 1

| Class | Description |
|---|---|
| IndexSegmentService | An index segment is a pieces of the master index constrained to a range of entries for performance optimization. A range is defined by the IndexSegmentRange class and the index is kept in memory. This class exposes a Jini service for dynamic availability reasons. |
| IndexEntry | An index entry contains an identifier, reference to a content page, field reference, hit count and context flags. |
| IndexField | A field entry contains only an identifier and text name. It is used for database normalization by the index entries. |
| IndexPage | A page reference contains a document identifier, URL to the indexed page, a signature key, mime type, modification date, title, description and index file reference. |
| IndexContext | A context defines a position where the index entry was found, either in the title, meta information or in the body of the document. |
| IndexInputStream | This stream provides utility functionality to make it easier to read index objects from an input device. |
| IndexOutputStream | This stream provides utility functionality to make it easier to write index objects to an output device. |
| IndexSegmentRange | This class encapsulates a segment range, which is defined by two string values representing the from and to tokens. |

Alternative Segmented Index System

FIG. 13 is a functional data flow diagram illustrating an alternative embodiment of the central cataloging site of FIG. 6. In FIG. 13, a web server 4700 is the main gateway for all updates and search requests. An update batch processor 4702 receives, stores, and applies update batches and also index server 4706 determines which index segment storage areas 4712, 4714 are available for use, applies the search request, and transmits the results to the web server 4700 which, in turn, collects and collates all search results and transmits these results back to the requesting system in a formatted manner.

Segmented Resource Indexing System on an Intranet

The segmented indexing system may be used not only on the global communications network but on corporate Intranets as well. A typical corporate intranet includes a central location, such as a corporate headquarters, at which a central searchable database is maintained, and a number of remote locations, such as regional offices or stores, coupled to the central location through a network of intranet. Each remote location transfers data to the central location for storage in the central database. The remote locations may also search the central database for desired information.

With the architecture of the indexing system, everything, including each field in a local database, is treated as an object. Instead of copying each object to a central location, an object reference is created at each local site and sent to a cataloging location or locations. The objects are not duplicated in a monolithic central database. One advantage to this architecture is that the decision of whether to expose the existence and classification of local objects becomes the responsibility and choice of the author, rather than a generic decision. In the system, the implementation of retention rules and the physical location of the objects remain with the author. The searchable segmented central catalog merely references the distributed objects, eliminating the need to make full copies and therefore manage a large storage system. Each local site 1 generates and transfers information to the central server, or to a plurality of central servers, for use in a searchable segmented catalog.

Figure 14:
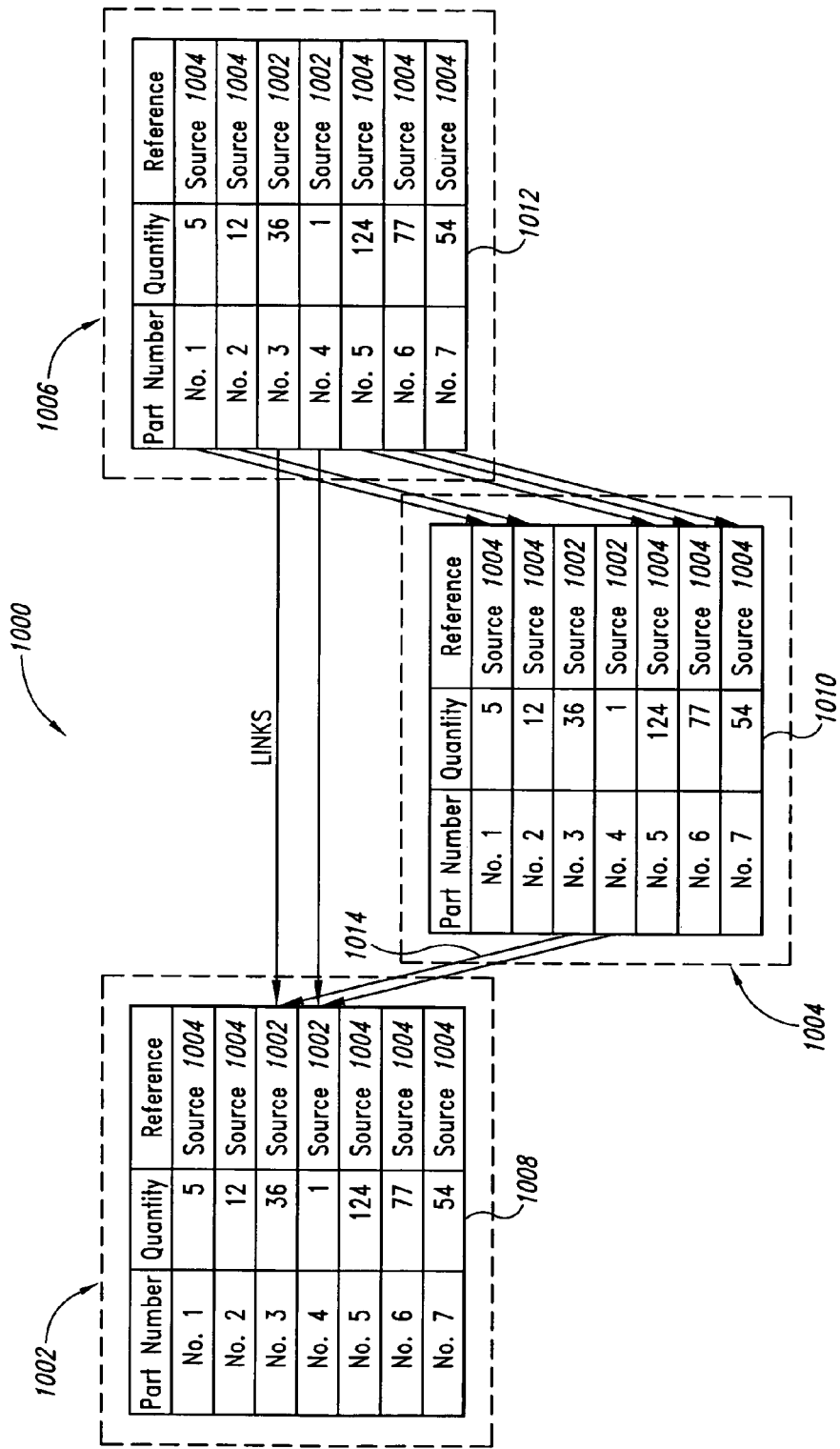
FIGS. 14 and 15 are diagrams illustrating operation of a distributed accounting and inventory system on an intranet according to one embodiment of the present invention.
Figure 15:
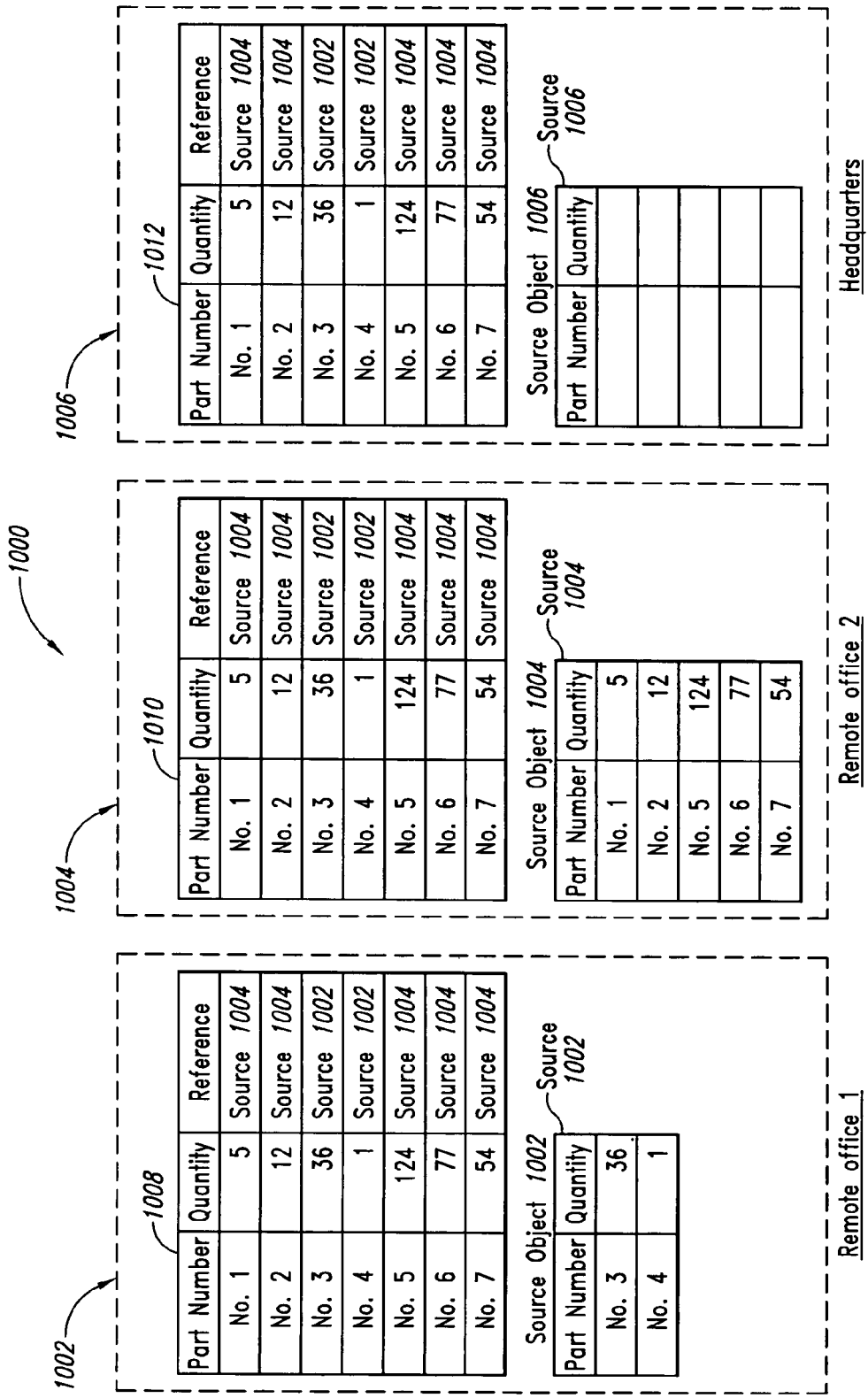

FIGS. 14 and 15 are diagrams illustrating operation of a distributed accounting and inventory system on an intranet 1000 according to one embodiment of the present invention. In FIG. 14, the intranet 1000 includes three different physical locations 1002, 1004, and 1006 including catalogs 1008, 1010, and 1012, respectively. Each location 1002–1006 also includes a source of objects (not shown in FIG. 14) that corresponds to an inventory of items at that location. The sources of objects or sources for the locations 1002, 1004, 1006 are designated sources 1002, 1004, and 1006, respectively, in records of the respective catalogs 1008–1012. In the example of FIG. 14, the source 1006 is empty (i.e., no inventory items at location 1006).

Each of the catalogs 1008–1012 is a catalog of object references to objects in the source at the corresponding location and to objects at the other locations. For example, the catalog 1010 at location 1004 includes a record for part no. 1, which is part of the inventory or source 1004 at this location. The catalog 1010 further includes an object reference, as indicated by the arrow 1014, for part no. 3, which is part of the inventory or source 1008 at location 1002. The catalog 1010 does not store a duplicate copy of the information in the record for part no. 3, but instead merely stores a reference to that object.

FIG. 15 is another diagram of the intranet 1000 expressly illustrating the sources 1002–1006 on the locations 1002–1006, respectively. The source 1006 is shown as containing no objects, such as may be the situation where the location 1006 is at a headquarters of a corporation. The sources 1002 and 1004 each include objects or inventory items, such as where these locations are remote offices of the corporation. This example illustrates that records for objects are not duplicated on each location 1002–1006, but instead object references in each of the catalogs 1008–1012 point to objects stored in remote sources. The segmented index for an intranet system provides several advantages in accounting or inventory control applications, and others. A conventional intranet system requires the centralization of the catalog for purposes of control. The segmented intranet system separates the control of the physical inventory (objects in the sources 1002–1006) from accounting control. Since the whole intranet includes only objects and object references, then central reporting and planning can occur to the location 1006, but such reporting merely corresponds to data being read from the remote locations 1002, 1004, and no data is modified. In the intranet 1000, each location 1002–1006 functions as both a server and a client, and minor latency between the locations is not critical because, within each location, accounting and physical control remain linked. Latency need be considered only where authority to sell or transfer inventory (objects in the sources 1002–1006) is separate from the physical control of the inventory.

With the segmented intranet system, the author of an object has physical control over that object and thus may decide what objects are to be exposed for searching by other locations. As a result, the segmented intranet index system is well suited for high-security management systems that typically require elaborate security procedures to prevent unauthorized duplication of data. For example, assume there are 200 remote information generators (offices, salespeople, etc.). With this intranet system, data access to information in the objects is maintained through the use of the references available to both the central location and the remote.

The intranet system also provides a more effective means to organize and describe organizational data, creating a much more flexible environment for data retention handling. A data retention handling system has two primary goals: 1) eliminate obsolete data to prevent confusion with current data and reduce storage requirements; and 2) reduce liability. Typically, hierarchical storage management ("HSM") systems have been used for these purposes. An HSM system stores frequently-used or relatively new files on high-speed, immediately available, and most expensive storage media. Older files or files that are not as frequently used are stored on "near-line" storage media that may consist of automatically mounted tape drives or CD-ROMs. Old files or files that are almost never used are stored off-line on tape or other inexpensive high-capacity media. Some files may eventually be deleted if they fall within certain parameters of usage, type, or age. The intranet system overcomes these potential difficulties of a HMS system. For example, in the intranet system, duplicate copies of records are not maintained at each location, thereby eliminating the need for hierarchical storage media to provide the required access to stored records.

It is to be understood that even though various embodiments and advantages of the present invention have been set forth in the foregoing description, the above disclosure is illustrative only, and changes may be made in detail, and yet remain within the broad principles of the invention. Therefore, the present invention is to be limited only by the appended claims.

What is claimed is:

1. A computing system with a key-ordered list of data objects distributed over a plurality of servers which allows discrete parallel processing on said servers, comprising:
  (a) a self contained key-ordered list of data objects;
  (b) a plurality of memories in a plurality of servers, each memory containing a segment of the self-contained key-ordered list of data objects where each segment consists of a contiguous subset of said objects having keys with a specified range; and
  (c) a query processor which receives queries and, based on data content of the query, directs each received query to one of said plurality of servers by comparing the data content of the query to the specified range of keys for each segment, wherein there are at least two copies of said memories for a segment of said segmented list, and one of the copies for a segment is available for updates, the other copies for the segment are available for queries.

2. The system of claim 1 where at least one segment includes two or more objects having the same key.

3. The system of claim 1 where independent processors serve at least two of the segments such that the segments can be accessed simultaneously.

4. The system of claim 1 where each segment is a proper subset of the key-ordered list.

5. The system of claim 1 where, for each object, the key is expressed in complete form such that look-ups can be performed directly based on data content of each query.

6. The system of claim 1 additionally comprising an update processor which receives updates and, based on data content of the update, directs each received update to one of said plurality of servers by comparing the data content of the update to the specified range of keys for each segment.

7. The system of claim 1 further including means for receiving multiple queries from a single source, directing each query to a different server, combining results of said multiple queries, and directing said results back to the source of the queries.

8. The system of claim 1 where each data object includes a key and one or more data constructs for each of a plurality of said objects.

9. The system of claim 1 where each object is comprised of a type and a value specifically stored as a pair.

10. The system of claim 1 where, for two or more of said objects, each object includes a reference to a location of an associated object on a network.

11. The system of claim 1 where updates and queries can occur simultaneously.

12. The system of claim 1 where at least one copy of each segment is available for query processing at all times.

13. A method of operating a computing system with a key-ordered list of objects distributed over a plurality of servers which allows discrete parallel processing on said servers, comprising:
  (a) creating a self contained key-ordered list of data objects;
  (b) operating a plurality of servers with a plurality of memories, each memory containing a segment of the self contained key-ordered list of data objects where each segment consists of a contiguous subset of said objects having keys with a specified range; and
  (c) operating a query processor which receives queries and, based on data content of the query, directs each received query to one of said plurality of servers by comparing the data content of the query to the specified range of keys for each segment,
  wherein there are at least two copies of said memories for a segment of said segmented list, and one of the copies for a segment is available for updates, the other copies for the segment are available for queries.

14. A set of computer data containing a set of computer programs which, resided in a plurality of servers, causes the servers to perform the method of claim 13.

15. The method of claim 13 where at least one segment includes two or more objects having the same key.

16. The set of computer data of claim 14 further including the limitations of claim 15.

17. The method of claim 13 where independent processors serve at least two of the segments such that the segments can be accessed simultaneously.

18. The set of computer data of claim 14 further including the limitations of claim 17.

19. The method of claim 13 where each segment is a proper subset of the key-ordered list.

20. The set of computer data of claim 14 further including the limitations of claim 19.

21. The method of claim 13 where, for each object, the key is expressed in complete form look-ups are performed directly based on data content of each query.

22. The set of computer data of claim 14 further including the limitations of claim 21.

23. The method of claim 13 further comprising of receiving updates and, based on data content of the update, directing each received update to one of said plurality of servers by comparing the data content of the update to the specified range of keys for each segment.

24. The set of computer data of claim 14 further including the limitations of claim 23.

25. The method of claim 13 further comprising receiving multiple queries from a single source, directing each query to a different server, combining results of said multiple queries, and directing said results back to the source of the queries.

26. The set of computer data of claim 14 further including the limitations of claim 25.

27. The method of claim 13 where each data object includes a key and one or more data constructs for each of a plurality of said objects.

28. The set of computer data of claim 14 further including the limitations of claim 27.

29. The method of claim 13 where each object is comprised of a type and a value specifically stored as a pair.

30. The set of computer data of claim 14 further including the limitations of claim 29.

31. The method of claim 13 where for two or more of said objects each object includes a reference to a location of an associated object on a network.

32. The set of computer data of claim 14 further including the limitations of claim 31.

33. The method of claim 13 where updating and querying can occur simultaneously.

34. The method of claim 13 where at least one copy of each segment is available for query processing at all times.

* * * * *